US012656898B2

(12) United States Patent
Sakaguchi

(10) Patent No.: US 12,656,898 B2
(45) Date of Patent: Jun. 16, 2026

(54) INFORMATION PROCESSING APPARATUS, INFORMATION PROCESSING METHOD, AND NON-TRANSITORY COMPUTER READABLE MEDIUM

(71) Applicant: FUJIFILM Business Innovation Corp., Tokyo (JP)

(72) Inventor: Katsutoshi Sakaguchi, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 18/180,934

(22) Filed: Mar. 9, 2023

(65) Prior Publication Data

US 2024/0069663 A1 Feb. 29, 2024

(30) Foreign Application Priority Data

Aug. 31, 2022 (JP) ................................ 2022-137975

(51) Int. Cl.
*G06F 3/041* (2006.01)
*G06F 3/044* (2006.01)
*H04N 1/00* (2006.01)

(52) U.S. Cl.
CPC ............ *G06F 3/0416* (2013.01); *G06F 3/044* (2013.01); *G06F 2203/04101* (2013.01); *G06F 2203/04108* (2013.01); *H04N 1/00411* (2013.01)

(58) Field of Classification Search
None
See application file for complete search history.

(56) References Cited

U.S. PATENT DOCUMENTS

2012/0299848 A1* 11/2012 Homma ................ G06F 3/0488 345/173
2014/0118276 A1* 5/2014 Chiu ..................... G06F 3/0304 345/173

FOREIGN PATENT DOCUMENTS

JP 2014-182657 A 9/2014

* cited by examiner

*Primary Examiner* — Nicholas J Lee
(74) *Attorney, Agent, or Firm* — Oliff PLC

(57) ABSTRACT

An information processing apparatus includes a processor configured to switch a mode between a first mode and a second mode in response to an operation performed on a screen in a contactless manner in accordance with the mode, the first mode being a mode in which a first screen for performing a contact operation with a target contacting an object in the screen is displayed, the second mode being a mode in which a second screen for performing a contactless operation without the target contacting the object in the screen is displayed, the second screen being related to the first screen and different from the first screen in a display form of the object.

11 Claims, 13 Drawing Sheets

10

40

DOCUMENT
READING DEVICE 12

IMAGE FORMING DEVICE 14

INPUT DEVICE 31

DISPLAY DEVICE 32

COMMUNICATION
DEVICE 33

I/O 45

46

CPU 41

RAM 42

ROM 43

NON-VOLATILE
MEMORY 44

INFORMATION PROCESSING APPARATUS, INFORMATION PROCESSING METHOD, AND NON-TRANSITORY COMPUTER READABLE MEDIUM

CROSS-REFERENCE TO RELATED APPLICATIONS

This application is based on and claims priority under 35 USC 119 from Japanese Patent Application No. 2022-137975 filed Aug. 31, 2022.

BACKGROUND

(i) Technical Field

The present disclosure relates to an information processing apparatus, an information processing method, and a non-transitory computer readable medium.

(ii) Related Art

For example, Japanese Unexamined Patent Application Publication No. 2014-182657 describes an information processing apparatus capable of displaying, with ease, a portion of a first window that is hidden by a second window. The information processing apparatus includes input means for inputting position information indicating a position of an operating body for operating a window being displayed on a display unit, and display control means for operating the window being displayed on the display unit based on the position information. If a portion of the first window is hidden by the second window, the display control means switches the display state of the hidden portion from an invisible state to a visible state when a distance between the operating body and the display unit, which is indicated by the position information, falls within a predetermined numerical range.

SUMMARY

A technique is available for switching between a mode for performing an operation on an object in a screen in a contact manner and a mode for performing an operation on the object in the screen in a contactless manner. A user has to touch a specific button in the screen to perform an operation in a contactless manner. It is therefore desirable to switch between the modes without the user touching the screen.

Aspects of non-limiting embodiments of the present disclosure relate to an information processing apparatus and an information processing program capable of switching between a mode for performing an operation on an object in a screen in a contact manner and a mode for performing an operation on the object in the screen in a contactless manner without a user touching the screen.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing apparatus including a processor configured to switch a mode between a first mode and a second mode in response to an operation performed on a screen in a contactless manner in accordance with the mode, the first mode being a mode in which a first screen for performing a contact operation with a target contacting an object in the screen is displayed, the second mode being a mode in which a second screen for performing a contactless operation without the target contacting the object in the screen is displayed, the second screen being related to the first screen and different from the first screen in a display form of the object.

BRIEF DESCRIPTION OF THE DRAWINGS

An exemplary embodiment of the present disclosure will be described in detail based on the following figures, wherein.

DETAILED DESCRIPTION

The following describes an exemplary embodiment of the present disclosure in detail with reference to the drawings. Components and processes that have substantially the same operations and functions are assigned the same reference symbols throughout the drawings, and redundant descriptions thereof may be omitted. The drawings are merely presented in schematic form to allow a full understanding of the present disclosure. Therefore, the present disclosure is not limited to only the illustrated examples. In this exemplary embodiment, descriptions of configurations that are not directly related to the present disclosure or are well known may be omitted.

Figure 1:
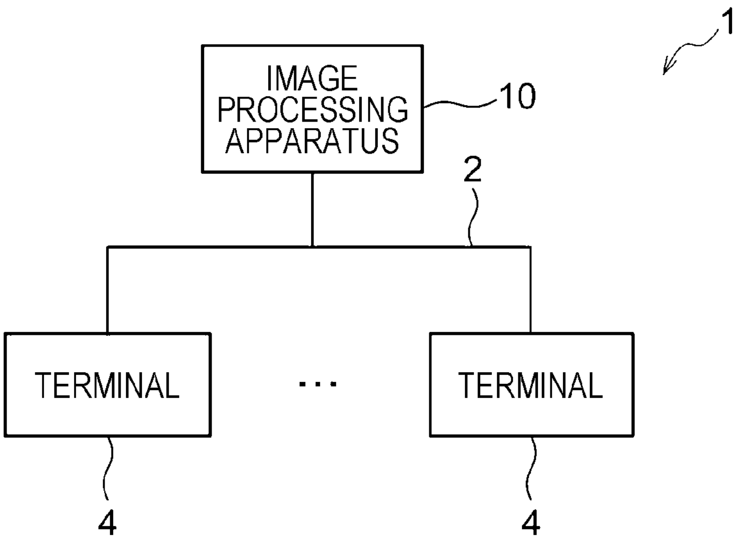
FIG. 1 is a diagram illustrating an example configuration of an information processing system including an information processing apparatus having a contactless user interface through which a user performs an operation in a contactless manner.

FIG. 1 is a diagram illustrating an example configuration of an information processing system 1 including an information processing apparatus having a contactless user interface through which a user performs an operation in a contactless manner.

The information processing apparatus in the information processing system 1 may be applied to any field as long as the information processing apparatus has a contactless user interface. Examples of the information processing apparatus include an image processing apparatus, an automatic teller machine (ATM), a vending machine, and an automatic ticket dispenser. The information processing apparatus may be for personal use only or usable by an unspecified number of users.

For example, an image processing apparatus 10 installed in a workplace as an example of the information processing apparatus will be described hereinafter with reference to FIGS. 1 and 2.

Figure 2:
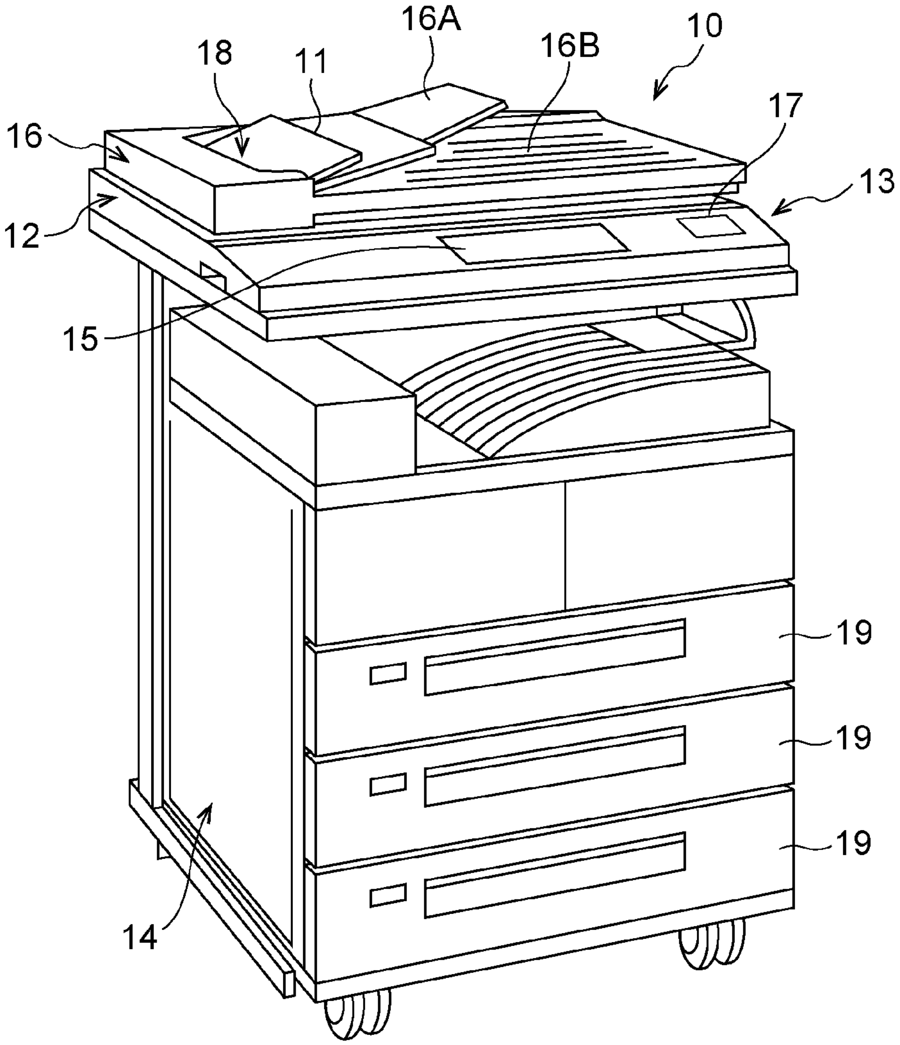
FIG. 2 is a perspective view of a substantial part of an image processing apparatus according to an exemplary embodiment.

FIG. 2 is a perspective view of a substantial part of the image processing apparatus 10 according to this exemplary embodiment.

As described below, the image processing apparatus 10 is configured to execute functions related to images in accordance with instructions from users. The image processing apparatus 10 is connected to, for example, a plurality of terminals 4 to be used by individual users via a communication line 2.

Each user transmits image data generated by a corresponding one of the terminals 4 to the image processing apparatus 10 through the communication line 2 to cause the image processing apparatus 10 to execute desired image processing. Alternatively, a user may bring a portable storage medium such as a Universal Serial Bus (USB) memory or a memory card storing image data to the image processing apparatus 10 and connect the portable storage medium to the image processing apparatus 10 to cause the image processing apparatus 10 to execute desired image processing. Alternatively, a user may bring a document 11 having at least one of text or an image to the image processing apparatus 10 and make the image processing apparatus 10 read the document 11 to cause the image processing apparatus 10 to execute desired image processing.

The communication line 2 may be of any type that provides a connection between the image processing apparatus 10 and the terminals 4, such as a wired connection, a wireless connection, or a combination of wired and wireless connections. In addition, any number of terminals 4 may be connected to the image processing apparatus 10. For example, none of the terminals 4 may be connected to the image processing apparatus 10.

The terminals 4 are information devices configured to be used by users. The terminals 4 may be any type of information device having a data storage function and a data communication function. The terminals 4 include, for example, computers intended to be used at fixed positions, and mobile terminals intended to be transported and used, such as smartphones and wearable devices.

As illustrated in FIG. 2, the image processing apparatus 10 has, for example, a scan function for reading an image on a recording medium such as paper as image data, a print function for forming an image represented by image data on a recording medium, and a copy function for forming the same image as an image formed on a recording medium onto another recording medium. The copy function, the print function, and the scan function are examples of image processing to be performed by the image processing apparatus 10.

The image processing apparatus 10 illustrated in FIG. 2 includes, for example, a document reading device 12 in an upper portion thereof, and an image forming device 14 below the document reading device 12.

The document reading device 12 includes an optical reading device (not illustrated) and a document transport device 18. The document transport device 18 is disposed in a document cover 16. The document cover 16 is provided with a document table 16A, on which documents 11 are placed. The document transport device 18 sequentially feeds each of the documents 11 on the document table 16A and transports the document 11 onto a transported-document scanning glass (not illustrated). The document reading device 12 reads the content of the document 11 transported onto the transported-document scanning glass as image data using the optical reading device. Thereafter, the document transport device 18 discharges the document 11 whose content has been read onto a discharge table 16B included in the document cover 16.

The image forming device 14 forms an image represented by image data on a recording medium. Recording media are stored in storage trays 19 that are classified by the type or size of recording media. The image forming device 14 may form an image in any color on a recording medium and may form a color image or a monochrome image.

The image processing apparatus 10 includes, in a front portion thereof, an operation display device 13 that accepts an operation for executing various functions such as the copy function, the print function, and the scan function from a user.

Specifically, the operation display device 13 includes a reader device 17 that acquires information on a user who performs an operation, and an operation panel 15 that accepts an operation performed by the user.

For example, in response to the user bringing their employee identity card close to the reader device 17, the reader device 17 reads identification information (referred to as a "user ID") for uniquely identifying the user from an integrated circuit (IC) chip incorporated in the employee identity card in a contactless manner.

The operation panel 15 is a display having a touch panel superimposed thereon. The operation panel 15 displays, as an icon image, an object to be operated by the user to execute a desired function. The object may be of any type that is to be operated by the user, and includes, for example, a button, a scroll bar, a check box, and a radio button. In response to the user performing an operation on the object, the image processing apparatus 10 executes a process associated in advance with the content of the operation, and a response to the operation is displayed on the operation panel 15.

Figure 3A:
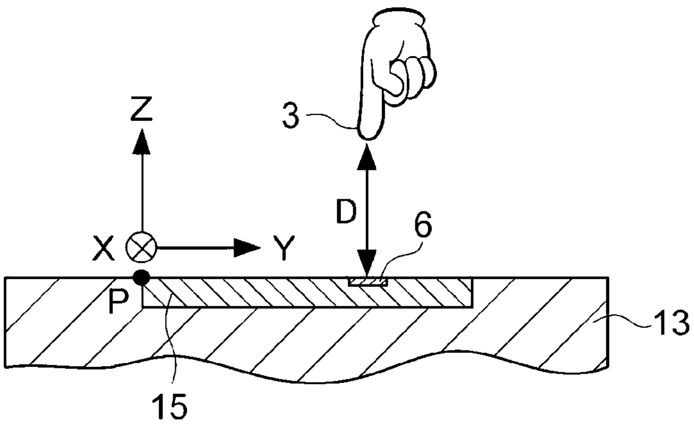
FIG. 3A is a sectional view of an operation panel.
Figure 3B:
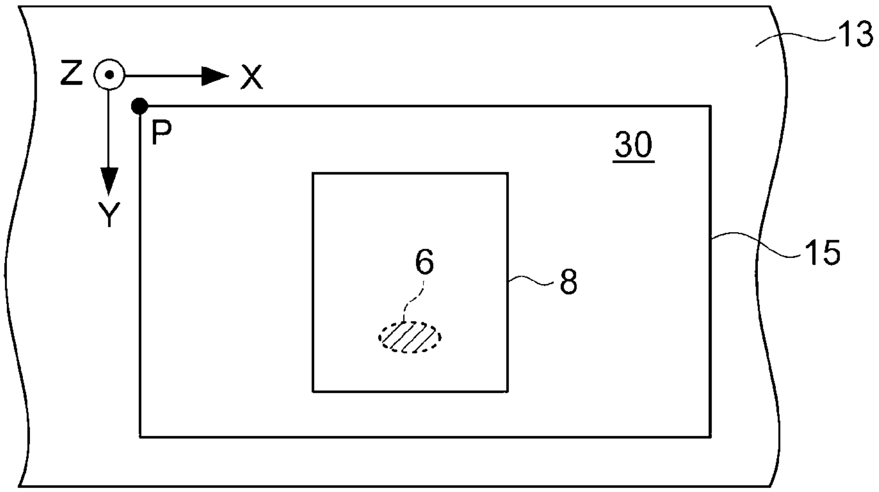
FIG. 3B is a plan view of the operation panel when viewed in a direction facing a display surface of the operation panel.

FIGS. 3A and 3B illustrate an example of the operation panel 15 that allows detection of an operation position 6 of the user in a contactless manner. FIG. 3A is a sectional view of the operation panel 15, and FIG. 3B is a plan view of the operation panel 15 when viewed in a direction facing a display surface of the operation panel 15.

The operation panel 15 detects the position of the user's finger, that is, the operation position 6, in a contactless manner. The phrase "detecting the operation position 6 in a contactless manner" refers to detecting the position of a user's finger in response to the user holding their finger in a mid-air space that is above a display surface of the operation panel 15 and that is away from the display surface of the operation panel 15 in a range of the display surface of the operation panel 15 without pressing their finger against the display surface of the operation panel 15. A mid-air space above the display surface of the operation panel 15 in a range of the display surface of the operation panel 15 is hereinafter referred to as a mid-air space "over the operation panel 15" or "above the operation panel 15". The phrase "holding the user's finger over something (such as the operation panel 15)" means that the user points at a position in a mid-air space over the operation panel 15 with their finger without touching the display surface of the operation panel 15.

The operation panel 15 includes a so-called capacitive touch panel that detects the operation position 6 from a change in electrostatic capacitance caused by the user holding their finger over the operation panel 15. In the operation panel 15 including such a touch panel, a change in electrostatic capacitance at a position closest to the user's finger is larger than a change in electrostatic capacitance at any other position. Accordingly, the operation panel 15 outputs, as the operation position 6 of the user, a position at which the change in electrostatic capacitance is largest within the range of the operation panel 15.

To identify the operation position 6 of the user on the operation panel 15, an operation coordinate system is defined for the operation panel 15 to define a detection area for contactless detection of the position of the user's finger. The operation coordinate system is represented as a three-dimensional coordinate system having any position on the operation panel 15 as an origin P. In the example of the operation panel 15 illustrated in FIGS. 3A and 3B, the origin P is set at one of the vertices of the outline of the rectangular operation panel 15. In the example of the operation panel 15 illustrated in FIGS. 3A and 3B, furthermore, an X axis is set along a lateral direction of the operation panel 15 with respect to the origin P, a Y axis is set along a longitudinal direction of the operation panel 15 with respect to the origin P, and a Z axis is set so as to be orthogonal to the X and Y axes. The Z-axis direction is referred to as a height direction of the operation panel 15.

The operation position 6 of the user on the operation panel 15 is represented by a coordinate point (x, y), which is a combination of the coordinate value x of the X coordinate and the coordinate value y of the Y coordinate of a position at which the change in electrostatic capacitance is largest within the range of the operation panel 15.

When the operation panel 15 displays objects, an object displayed so as to include the operation position 6 of the user is recognized as the object being operated by the user. In the example of the operation panel 15 illustrated in FIG. 3B, since the operation position 6 of the user is included in the area of a button 8 in a screen 30 displayed on the operation panel 15, the user is recognized as operating the button 8. An object displayed so as to include the operation position 6 of the user may be hereinafter referred to as an "object corresponding to the operation position 6". The operation position 6 is an example of a "detected position at which an operation performed by a user has been detected" according to this exemplary embodiment. As illustrated in FIG. 3A, the length of a perpendicular drawn from a user's finger 3, which is held over the operation panel 15, to the display surface of the operation panel 15, that is, the distance from the user's finger 3 to the operation panel 15 in the height direction of the operation panel 15, is represented by an "operation distance D". The user's finger 3 is an example of a target with which the user performs operations. The target may be a body part of the user, other than the user's hand or fingers, or may be a stylus or any other tool owned by the user. As the operation distance D decreases, the change in electrostatic capacitance at the operation position 6 of the user increases on the operation panel 15. Conversely, as the operation distance D increases, the change in electrostatic capacitance at the operation position 6 of the user decreases on the operation panel 15. Accordingly, associating the operation distance D with the amount of change in electrostatic capacitance in advance makes it possible to obtain the operation distance D from the amount of change in electrostatic capacitance on the operation panel 15.

Based on the correspondence relationship between the operation distance D and the amount of change in electrostatic capacitance, the operation panel 15 recognizes the operation position 6 of the user not only as a two-dimensional operation position 6 along the display surface of the operation panel 15 but also as a three-dimensional operation position 6 that takes the operation distance D into account. That is, when the operation position 6 of the user is represented as a three-dimensional position, the operation position 6 of the user is represented by a coordinate point (x, y, z) obtained by combining a coordinate value z representing the operation position 6 in the height direction of the operation panel 15 with the coordinate point (x, y). The coordinate value z is a coordinate value, on the Z axis, of a position the operation distance D away from the origin P along the Z axis.

The coordinate value z=0 means that the user is performing an operation while touching the display surface of the operation panel 15 with their finger. Accordingly, the image processing apparatus 10 also recognizes a difference in the manner of the operation of the user, such as whether the user is operating the operation panel 15 in a contactless manner or operating the operation panel 15 with their finger in contact with the operation panel 15. As described above, the operation panel 15 supports both a contact operation in which the user performs an operation while touching the display surface of the operation panel 15 with their finger and a contactless operation in which the user operates the operation panel 15 while holding their finger over the operation panel 15.

As described above, since the change in electrostatic capacitance at the operation position 6 of the user decreases on the operation panel 15 as the operation distance D increases, the operation distance D has an upper limit. If the user holds their finger over the operation panel 15 at a position exceeding the upper limit of the operation distance D, the electrostatic capacitance at the operation position 6 of the user does not change, and the operation panel 15 makes no response to the operation of the user.

The detection area for objects is a mid-air region that is about 3 cm away from the operation panel 15, for example. In other words, in response to the user moving the user's finger 3 close to a position about 3 cm from the operation panel 15, the electrostatic capacitance in the corresponding object changes and a contactless input is detected. The XYZ coordinates of the position in the detection area of the user's finger 3 are acquired as those of the operation position 6. In response to the user further moving the user's finger 3 to a position closer than 3 cm, the XYZ coordinates of the position are acquired.

Figure 4:
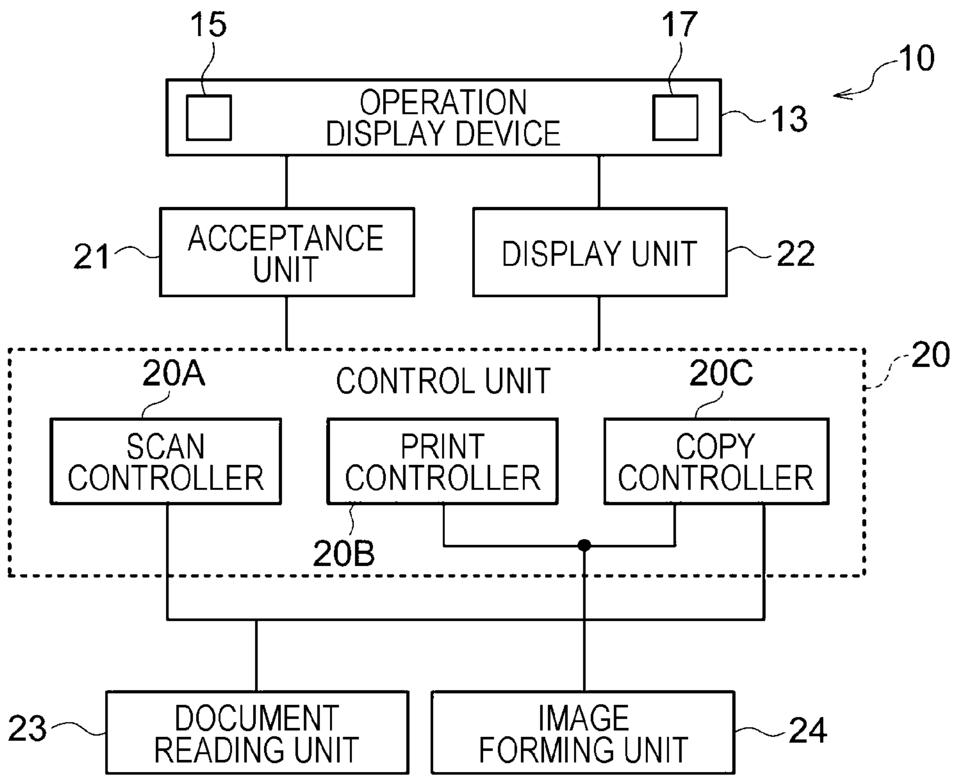
FIG. 4 is a diagram illustrating an example functional configuration of the image processing apparatus according to the exemplary embodiment.

FIG. 4 is a diagram illustrating an example functional configuration of the image processing apparatus 10 according to this exemplary embodiment. The image processing apparatus 10 includes functional units, namely, a control unit 20, an acceptance unit 21, a display unit 22, a document reading unit 23, and an image forming unit 24.

The acceptance unit 21 accepts a user ID of a user who operates the image processing apparatus 10 from the reader device 17 of the operation display device 13, and also accepts the operation position 6 of the user on the operation panel 15 from the operation panel 15 of the operation display device 13. The acceptance unit 21 further accepts image data from a portable storage medium connected to the terminal 4 of the user or the image processing apparatus 10. The acceptance unit 21 notifies the control unit 20 of the user ID, the operation position 6 of the user, and the image data, which have been accepted.

When notified of the user ID by the acceptance unit 21, the control unit 20 performs an authentication process to determine whether the user represented by the user ID is a user (referred to as a "registered user") permitted to use the image processing apparatus 10. When notified of the operation position 6 of the user on the operation panel 15 by the acceptance unit 21, the control unit 20 determines whether the object displayed at the operation position 6 of the user is selected in the screen 30 displayed on the operation panel 15, and executes a process associated in advance with the selected object. For example, if the object is a button 8 for starting the print function, the control unit 20 starts the print function to form an image represented by the image data accepted by the acceptance unit 21 on a recording medium.

Since the image processing apparatus 10 has the copy function, the print function, and the scan function, the control unit 20 includes a scan controller 20A that controls the scan function, a print controller 20B that controls the print function, and a copy controller 20C that controls the copy function. Any one of the scan controller 20A, the print controller 20B, and the copy controller 20C performs control in accordance with the content of the process associated with the object operated by the user. In one example, the image processing apparatus 10 may have a facsimile function. In this example, the control unit 20 includes a facsimile controller that controls the facsimile function.

When the operation performed by the user through the object is an operation related to the scan function, the scan controller 20A controls the document reading unit 23 to implement the scan function. When the operation performed by the user through the object is an operation related to the print function, the print controller 20B controls the image forming unit 24 to implement the print function. When the operation performed by the user through the object is an operation related to the copy function, the copy controller 20C controls the document reading unit 23 to generate image data of the document 11. Thereafter, the copy controller 20C controls the image forming unit 24 to form an image represented by the generated image data on a recording medium.

The document reading unit 23 drives the document reading device 12 under the control of the scan controller 20A and the copy controller 20C to, for example, transport each of the documents 11 placed on the document table 16A and generate image data of the transported document 11.

The image forming unit 24 drives the image forming device 14 under the control of the print controller 20B and the copy controller 20C to, for example, transport a recording medium stored in any of the storage trays 19 and form an image represented by the image data on the transported recording medium.

The display unit 22 displays, for example, a result of the authentication process performed on the user and a result of the process executed by the control unit 20 in response to the operation performed by the user through the object on the operation panel 15 in the operation display device 13 in accordance with an instruction from the control unit 20.

Figure 5:
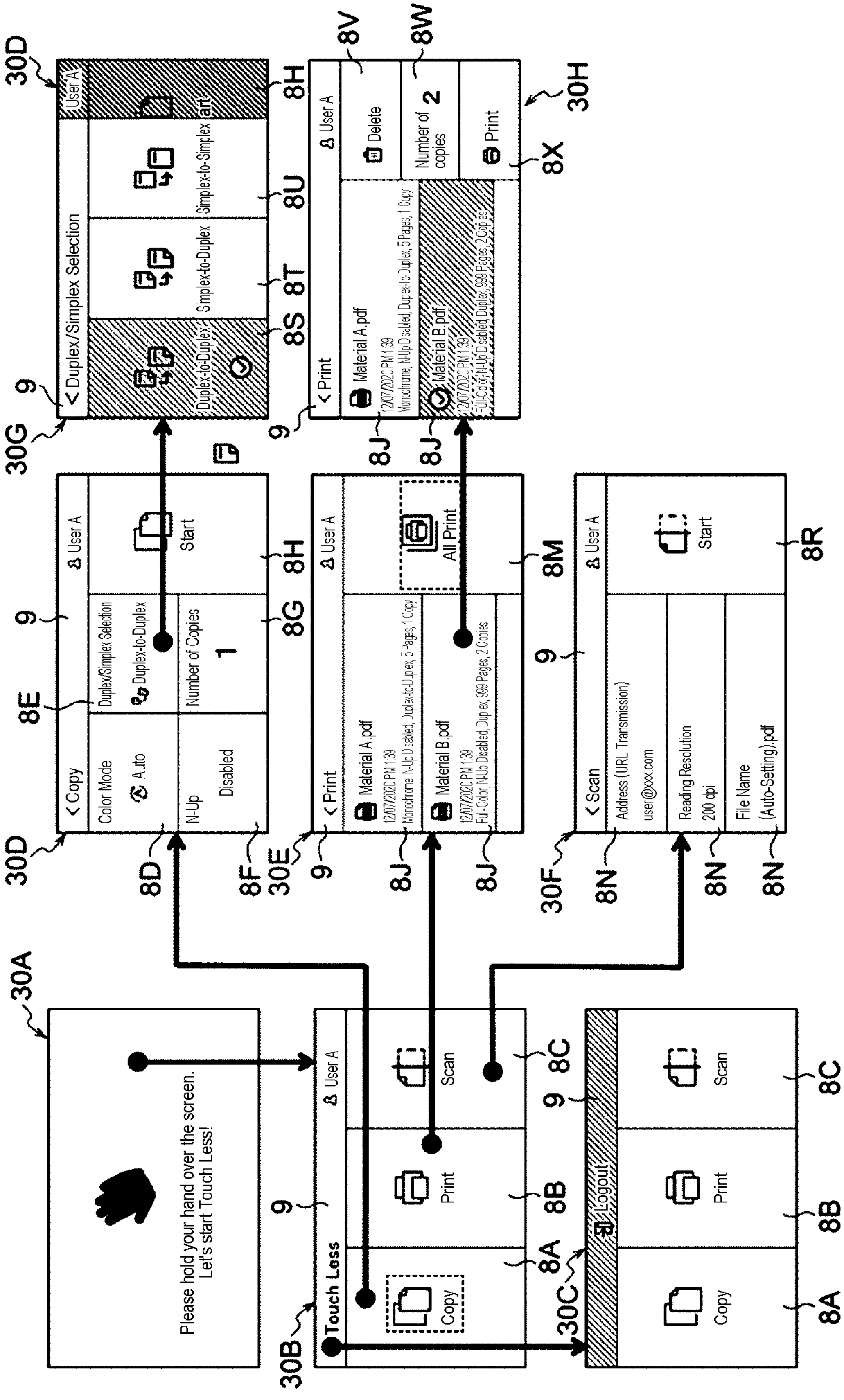
FIG. 5 is a diagram illustrating an example transition of a screen displayed on the operation panel, presenting how the screen transitions in response to the user operating the operation panel.

FIG. 5 is a diagram illustrating an example transition of the screen 30 displayed on the operation panel 15, presenting how the screen 30 transitions in response to the user operating the operation panel 15.

The display of the screen 30 on the operation panel 15, which is performed by the display unit 22, may also be interpreted as the display of the screen 30 on the operation panel 15 that is performed by the control unit 20 because the display unit 22 displays the screen 30 in accordance with an instruction from the control unit 20. A mid-air space extending along the Z axis and having a bottom surface corresponding to the display range of the screen 30 displayed on the operation panel 15 is expressed as a mid-air space "over the screen 30" or "above the screen 30", and a mid-air space extending along the Z axis and having a bottom surface corresponding to the display range of an object displayed in the screen 30 is expressed as a mid-air space "over the object" or "above the object". Like the expression "over the operation panel 15" or "above the operation panel 15", the expression "over the screen 30" or "above the screen 30" and the expression "over the object" or "above the object" do not mean the upper side of the screen 30 and the upper side of the object based on the up, down, left, and right directions in the real space, respectively, but mean a mid-air space in a direction facing the screen 30 and a mid-air space in a direction facing the object, respectively.

For convenience of description, screens 30 whose types are distinguished from each other are accompanied by different alphabet symbols associated with the types of the screens 30. Screens 30 whose types are not distinguished from each other are collectively expressed as the "screens 30" regardless of their types. Buttons 8, which are an example of objects, whose types are distinguished from each other are accompanied by different alphabet symbols associated with the types of the buttons 8. Buttons 8 whose types are not distinguished from each other are collectively expressed as the "buttons 8" regardless of their types.

When it is determined that the user who performs an operation is a registered user through the authentication process, the control unit 20 causes a start screen 30A to be displayed on the operation panel 15. The start screen 30A displays an instruction given to the user, such as "Please hold your hand over the screen" and "Let's start Touch Less!", for example.

When the user holds their finger over the start screen 30A, a cursor is displayed at the operation position 6 of the user on the start screen 30A. In the example of the start screen 30A illustrated in FIG. 5, a cursor in the shape of a hand is displayed. The shape of the cursor is an example, and, for example, a circular cursor may be displayed. In response the user holding their finger over the start screen 30A, a home screen 30B is displayed. The instruction given to the user in the start screen 30A is also used to instruct the user how to perform an operation on the operation panel 15.

The home screen 30B displays, for example, buttons 8 for individually selecting the various functions of the image processing apparatus 10, and a navigation bar 9 for displaying information useful for the user to perform an operation. Since the image processing apparatus 10 has the copy function, the print function, and the scan function, a "Copy" button 8A for selecting the copy function, a "Print" button 8B for selecting the print function, and a "Scan" button 8C for selecting the scan function are displayed on the home screen 30B. The navigation bar 9 displays, for example, the name of a user who has been authenticated, such as "user A", the name of a screen being displayed on the operation panel 15, such as "home", and information for notifying the user that the operation panel 15 is in a contactless operation mode, such as "Touch Less".

In response to the user holding their finger over the "Copy" button 8A, the "Copy" button 8A is selected. Upon selection of the "Copy" button 8A, a copy screen 30D is displayed on the operation panel 15. The copy screen 30D displays buttons 8D to 8G for setting copy conditions, and a copy start button 8H for starting copying under the set copy conditions.

The copy screen 30D illustrated in FIG. 5 displays, as an example of the buttons 8 for setting copy conditions, for example, a color mode button 8D for selecting a copy color, a duplex/simplex selection button 8E for selecting a double-sided (duplex) or single-sided (simplex) copy mode, an N-up button 8F for selecting an image layout on a recording medium, and a number-of-copies button 8G for selecting the number of copies to be made.

In response to the user holding their finger over any one of the buttons 8D to 8G for setting the respective copy conditions, the button 8 corresponding to the operation position 6 of the user is selected, and the screen 30 for setting the copy condition corresponding to the selected button 8 is displayed. In response to the duplex/simplex selection button 8E being selected on the copy screen 30D, a duplex/simplex selection screen 30G for selecting a duplex or simplex copy mode is displayed on the operation panel 15 in such a manner as to be superimposed on the copy screen 30D.

The duplex/simplex selection screen 30G illustrated in FIG. 5 displays, for example, a duplex-to-duplex selection button 8S for sequentially copying two-sided documents 11 on both sides of recording media, a simplex-to-duplex selection button 8T for sequentially copying one-sided documents 11 having text and the like on either side thereof on both sides of recording media, and a simplex-to-simplex selection button 8U for sequentially copying one-sided documents 11 having text and the like on either side thereof on either side of recording media.

In response to the user holding their finger over any one of the buttons 8S to 8U on the duplex/simplex selection screen 30G, the button 8 corresponding to the operation position 6 of the user is selected, and a copy mode corresponding to the selected button 8 is set. In the example of the duplex/simplex selection screen 30G illustrated in FIG. 5, the duplex-to-duplex selection button 8S is selected by the user.

In response to a duplex or simplex copy mode being set on the duplex/simplex selection screen 30G, the copy screen 30D is displayed on the operation panel 15. After the setting of the copy mode, the copy mode selected on the duplex/simplex selection screen 30G is displayed in the duplex/simplex selection button 8E on the copy screen 30D.

In the example described above, the user selects the duplex/simplex selection button 8E on the copy screen 30D. Also in response to the user selecting any one of the color mode button 8D, the N-up button 8F, and the number-of-copies button 8G on the copy screen 30D, a selection screen for selecting a copy condition corresponding to the selected one of the buttons 8 is displayed on the operation panel 15 in a manner similar to that for the duplex/simplex selection screen 30G.

In response to the user holding their finger over the copy start button 8H on the copy screen 30D, the copy start button 8H is selected. Upon selection of the copy start button 8H, a copying process for copying the content of the documents 11 on recording media is executed in accordance with the set copy conditions. Before the setting of the copy conditions, the buttons 8D to 8G on the copy screen 30D display initially set copy conditions that are set in advance.

In response to the user holding their finger over the "Print" button 8B on the home screen 30B, the "Print" button 8B is selected. Upon selection of the "Print" button 8B, a print screen 30E is displayed on the operation panel 15.

The print screen 30E displays print information buttons 8J each for displaying information on a piece of image data to be used for printing, and an all-print start button 8M for starting printing of all of the pieces of image data corresponding to the respective print information buttons 8J. In the example of the print screen 30E illustrated in FIG. 5, the print screen 30E in which two pieces of image data to be used for printing are accepted is illustrated. That is, the print screen 30E displays a number of print information buttons 8J equal to the number of pieces of image data accepted as targets for printing from the user, each print information button 8J corresponding to a corresponding one of the pieces of image data.

If the number of pieces of image data is too large to display the corresponding print information buttons 8J in the print screen 30E at the same time, in response to the user performing a gesture of moving their finger in an upward/downward direction of the print information buttons 8J, the operation panel 15 detects the movement of the operation position 6 and scrolls the print information buttons 8J. As a result, the print information buttons 8J that are not displayed in the print screen 30E are displayed in the print screen 30E.

Each of the print information buttons 8J displays a file name of image data to be used for printing and print conditions set by the user in advance for the image data. For example, when the user transmits image data from the terminal 4 to the image processing apparatus 10, print conditions set by the user using the terminal 4 are displayed in the print information button 8J.

In response to the user holding their finger over the all-print start button 8M, the all-print start button 8M is selected. Upon selection of the all-print start button 8M, a printing process for printing images represented by image data on recording media is executed in accordance with the set print conditions.

In response to the user holding their finger over any one of the print information buttons 8J, the print information button 8J over which the finger is held is selected. Upon selection of any one of the print information buttons 8J, a print edit screen 30H is displayed on the operation panel 15. The print edit screen 30H illustrated in FIG. 5 is displayed, for example, in response to the user selecting the print information button 8J corresponding to the image data representing "Material B.pdf".

The print edit screen 30H displays, for example, a delete button 8V for deleting the image data corresponding to the selected print information button 8J, a change button 8W for changing a print condition of the image data corresponding to the selected print information button 8J, and an individual-print start button 8X for printing only the image data corresponding to the selected print information button 8J. The print edit screen 30H illustrated in FIG. 5 displays, as an example of the change button 8W, a change button 8W for changing the number of copies to be printed. The print edit screen 30H also displays, for example, a change button 8W (not illustrated) for changing any other print condition, such as the color of an image to be printed.

In response to the user holding their finger over the "Scan" button 8C on the home screen 30B, the "Scan" button 8C is selected. Upon selection of the "Scan" button 8C, a scan screen 30F is displayed on the operation panel 15.

The scan screen 30F displays scan setting buttons 8N for setting scan conditions, and a scan start button 8R for starting reading of the documents 11 in accordance with the set scan conditions.

In response to the user holding their finger over any one of the scan setting buttons 8N, the scan setting button 8N corresponding to the operation position 6 of the user is selected, and a selection screen (not illustrated) for selecting the scan condition corresponding to the selected scan setting button 8N is displayed. That is, the user sets each of the scan conditions associated with the scan setting buttons 8N in the same manner as the operation of setting the copy conditions through the copy screen 30D. In response to the user holding their finger over the scan start button 8R, the scan start button 8R is selected. Upon selection of the scan start button 8R, a scanning process for converting the content of the documents 11 into image data is executed in accordance with the set scan conditions.

In response to the user holding their finger over the navigation bar 9 on the home screen 30B, the navigation bar 9 is selected. Upon selection of the navigation bar 9, a logout process of the authenticated user is performed. Then, as illustrated in a screen 30C, and the navigation bar 9 displays an indication of completion of the logout process.

The foregoing describes an example in which any one of the buttons 8 is selected in response to the user holding their finger over the button 8. In a contactless operation, the user's finger, which is in contact with the operation panel 15, can move. If an object whose area includes the operation position 6 is simply set as an object selected by the user because the area includes the operation position 6, another object adjacent to the object that the user is intended to operate may be incorrectly selected if the user's finger unintentionally moves. In addition, the user may pass their finger over another object not to be operated while moving the finger to above the object to be operated, and the unintended object may be incorrectly selected.

Accordingly, for example, when the user continuously holds their finger over an object for a predetermined period of time (a certain amount of time), the object over which the finger is held may be determined to be an object intentionally selected by the user. In other words, when the operation position 6 of the user remains located in the area of a specific object on the operation panel 15 for a predetermined period of time (a certain amount of time), it is determined that the user has selected the object. In this exemplary embodiment, the predetermined period of time is 3 seconds. However, this example is not limiting. For example, the predetermined period of time may be set to a time other than 3 seconds. The method for detecting the operation position 6 is not limited to a detection method using the operation panel 15, which is a capacitive touch panel. For example, the operation position 6 may be detected using a time-of-flight (ToF) camera or the like.

Figure 6:
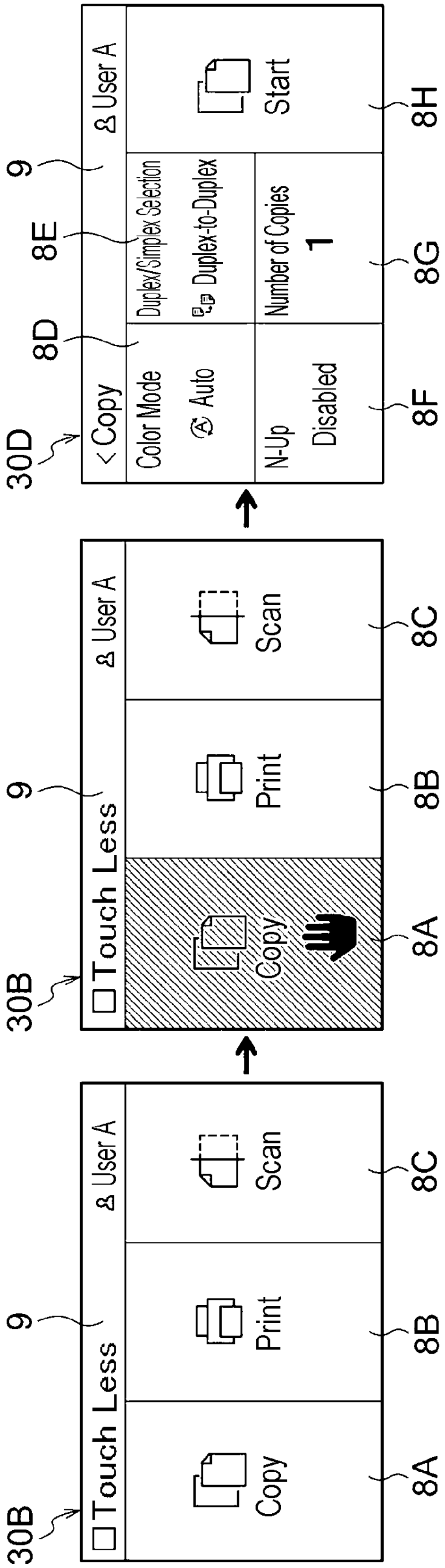
FIG. 6 is a diagram illustrating an example in which the user selects a "Copy" button, which is an example of an object, on a home screen.

FIG. 6 is a diagram illustrating an example in which the user selects the "Copy" button 8A, which is an example of an object, on the home screen 30B.

In response to the user holding their finger over the "Copy" button 8A, the operation position 6 is detected within the area of the "Copy" button 8A. Such a transition from a state in which the operation position 6 has not been detected within the area of an icon image to a state in which the operation position 6 has been detected within the area of an icon image is referred to as "selection start" or "hover". An icon image has not yet been selected as long as the icon image is in the "selection start" state.

When the user continuously holds their finger over the "Copy" button 8A and the detected operation position 6 remains located within the area of the "Copy" button 8A for a predetermined period of time (a certain amount of time), as illustrated in FIG. 6, the "Copy" button 8A is selected, and the copy screen 30D is displayed on the operation panel 15. The confirmation of selection of an icon image is referred to as "selection completion" or "hold". The completion of selection of an icon image is referred to as the icon image having been selected.

Accordingly, if the user's finger moves from over the "Copy" button 8A to another location during selection start, the selection start for the "Copy" button 8A is canceled. Such movement of the user's finger from over an icon image to another location during selection start is referred to as "deselection". After an icon image is deselected, the user again continuously holds their finger over the deselected icon image for a predetermined period of time (a certain amount of time), thereby completing the selection of the deselected icon image.

Each of the objects in the screens 30 is associated in advance with a process to be executed in response to the selection of the object such that a copying process is executed in response to selection of the copy start button 8H. To notify the user of the processes to be executed for the respective objects, each of the objects displays, for example, information indicating the content of the process to be executed in response to the selection of the object, such as "copy" for the copy start button 8H. The user understands a process associated with each of the objects by checking information indicating the content of the process to be executed in response to the selection of the object, that is, by checking an item associated with the object. As described above, the objects are displayed on the screens 30 in such a manner as to be associated with items each indicating the content to be processed. Accordingly, each of the objects is an example of an "item displayed on a screen" according to this exemplary embodiment.

Figure 7:
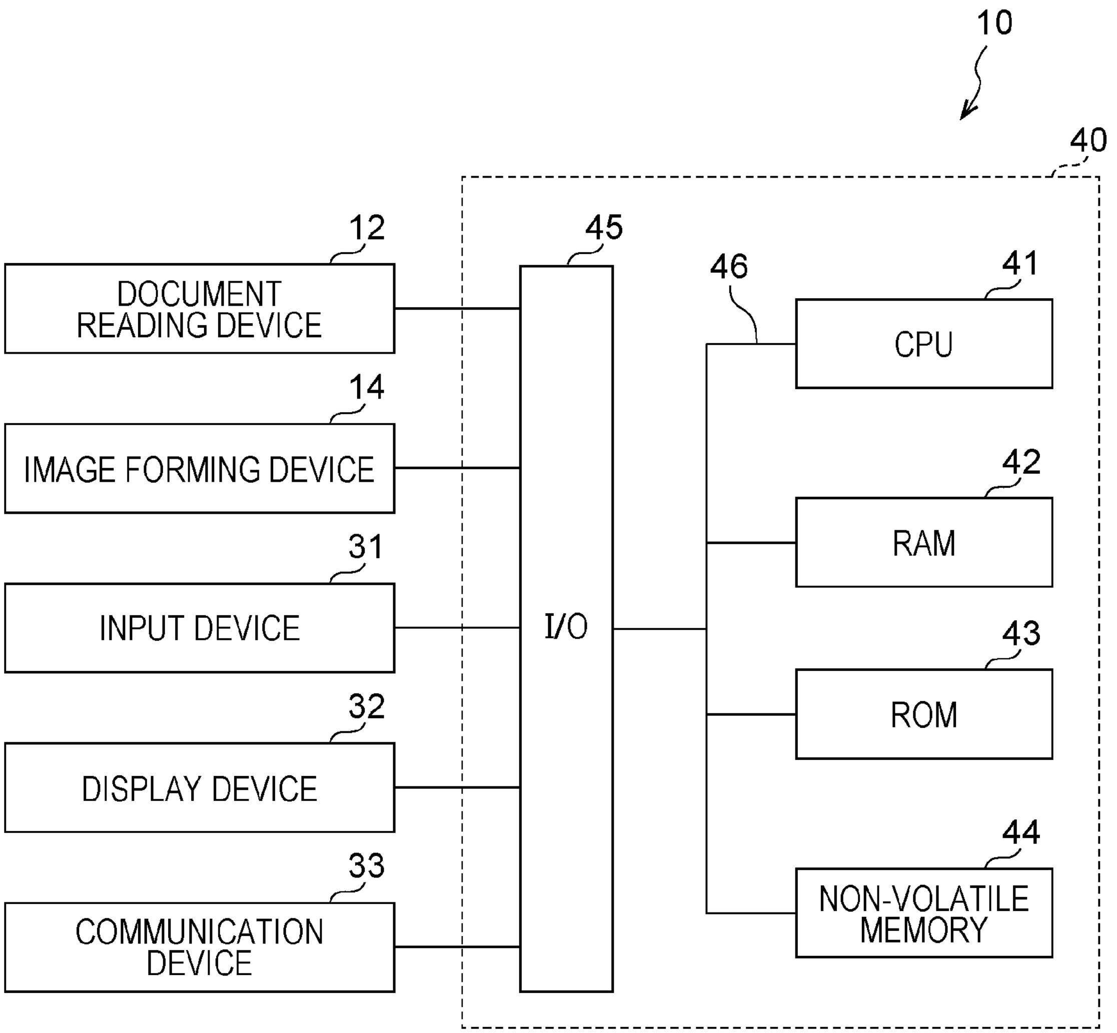
FIG. 7 is a block diagram illustrating an example configuration of a substantial part of an electrical system of the image processing apparatus according to the exemplary embodiment.

Next, the configuration of the substantial part of an electrical system of the image processing apparatus 10 will be described with reference to FIG. 7. The image processing apparatus 10 is implemented using, for example, a computer 40.

In the computer 40, a central processing unit (CPU) 41, a random access memory (RAM) 42, a read only memory (ROM) 43, a non-volatile memory 44, and an input/output interface (I/O) 45 are connected to each other via a bus 46.

The CPU 41 is an example of a processor configured to perform processing of the functional units of the image processing apparatus 10 illustrated in FIG. 4. The RAM 42 is an example of a storage medium to be used as a temporary work area for the CPU 41. The ROM 43 is an example of a storage medium that stores an information processing program to be executed by the CPU 41. The non-volatile memory 44 is an example of a storage medium configured such that information stored therein is maintained even if power supply to the non-volatile memory 44 is shut off. Examples of the non-volatile memory 44 include a semiconductor memory and a hard disk. The non-volatile memory 44 is not necessarily incorporated in the computer 40, and may be, for example, a storage medium attachable to the computer 40 in a removable manner, such as a memory card.

The I/O 45 is connected to, for example, the document reading device 12, the image forming device 14, an input device 31, a display device 32, and a communication device 33.

The document reading device 12 and the image forming device 14 are devices that perform operations as described above. The input device 31 is a device that notifies the CPU 41 of an instruction from the user and a user ID of the user in response to receipt of the instruction and the user ID. Examples of the input device 31 include a touch panel constituting the operation panel 15, and the reader device 17. The display device 32 is a device that visually displays information processed by the CPU 41. Examples of the display device 32 include a display constituting the operation panel 15. The communication device 33 is connected to the communication line 2 and has a communication protocol for communicating with the terminals 4. The devices connectable to the I/O 45 are not limited to the devices illustrated in FIG. 7. The I/O 45 may be connected to a device necessary for implementing a function in accordance with the functions of the image processing apparatus 10.

As described above, in switching between a mode for performing an operation on an object in a screen in a contact manner and a mode for performing an operation on the object in the screen in a contactless manner. A user has to touch a specific button in the screen to perform an operation in a contactless manner. It is therefore desirable to switch between the modes without the user touching the screen.

Accordingly, the image processing apparatus 10 according to this exemplary embodiment switches a mode between a first mode and a second mode in response to an operation performed on a screen in a contactless manner in accordance with the mode. In the first mode, a first screen for performing a contact operation with a target contacting an object in the screen is displayed. In the second mode, a second screen for performing a contactless operation on an object in the screen without the target contacting the object is displayed. The second screen is related to the first screen and is different from the first screen in the display form of the object. In the following, the first mode is referred to as a "contact operation mode", and the second mode is referred to as a "contactless operation mode".

The image processing apparatus 10 may be shared by a plurality of users. For example, in terms of hygiene, some users may desire to operate without touching a screen touched by another user as much as possible. This exemplary embodiment may make it possible to switch a mode between the contact operation mode and the contactless operation mode in response to an operation performed on the screen in a contactless manner in accordance with the mode, and allows a user to perform operation without touching the screen.

Figure 8:
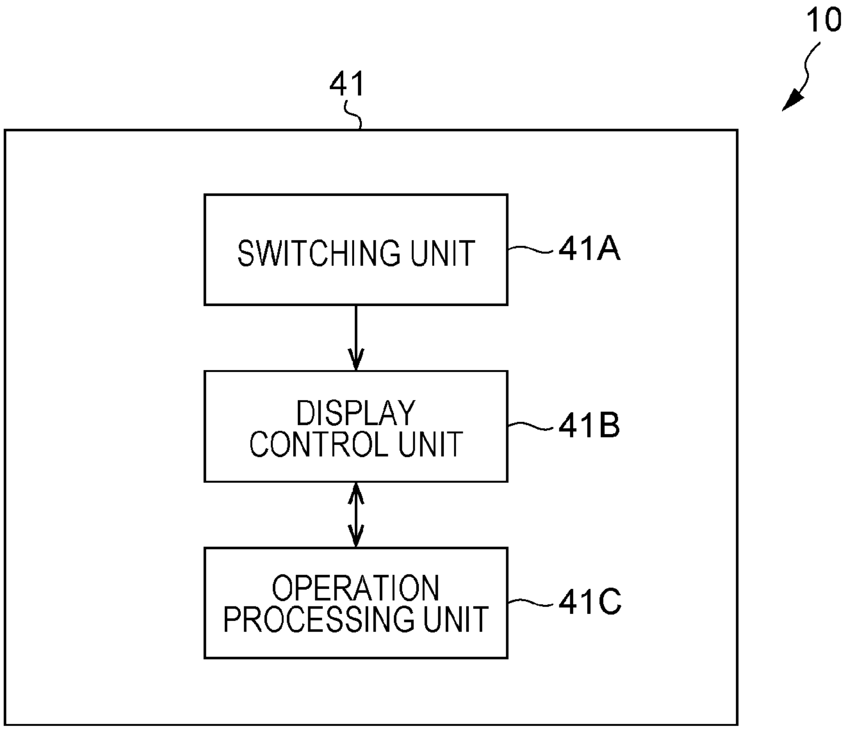
FIG. 8 is a block diagram illustrating an example functional configuration of the image processing apparatus according to the exemplary embodiment.

Specifically, the CPU 41 of the image processing apparatus 10 according to this exemplary embodiment functions as the components illustrated in FIG. 8 upon loading an information processing program stored in the ROM 43 into the RAM 42 and executing the information processing program.

FIG. 8 is a block diagram illustrating an example functional configuration of the image processing apparatus 10 according to this exemplary embodiment.

As illustrated in FIG. 8, the CPU 41 of the image processing apparatus 10 according to this exemplary embodiment functions as a switching unit 41A, a display control unit 41B, and an operation processing unit 41C.

The switching unit 41A switches a mode between a contact operation mode in which a first screen for performing a contact operation is displayed and a contactless operation mode in which a second screen for performing a contactless operation is displayed, in response to an operation performed on the screen in a contactless manner in accordance with the mode.

In response to the switching unit 41A switching the mode to the contact operation mode, the display control unit 41B performs control to display the first screen to perform a contact operation. In response to the switching unit 41A switching the mode to the contactless operation mode, the display control unit 41B performs control to display the second screen to perform a contactless operation.

In response to display of the first screen by the display control unit 41B, the operation processing unit 41C executes a process associated with an object selected by the user among objects included in the first screen. In response to display of the second screen by the display control unit 41B, the operation processing unit 41C executes a process associated with an object selected by the user among objects included in the second screen.

Next, a switching process for switching an operation mode between the contact operation mode and the contactless operation mode according to this exemplary embodiment will be described in detail with reference to FIGS. 9 to 13.

Figure 9:
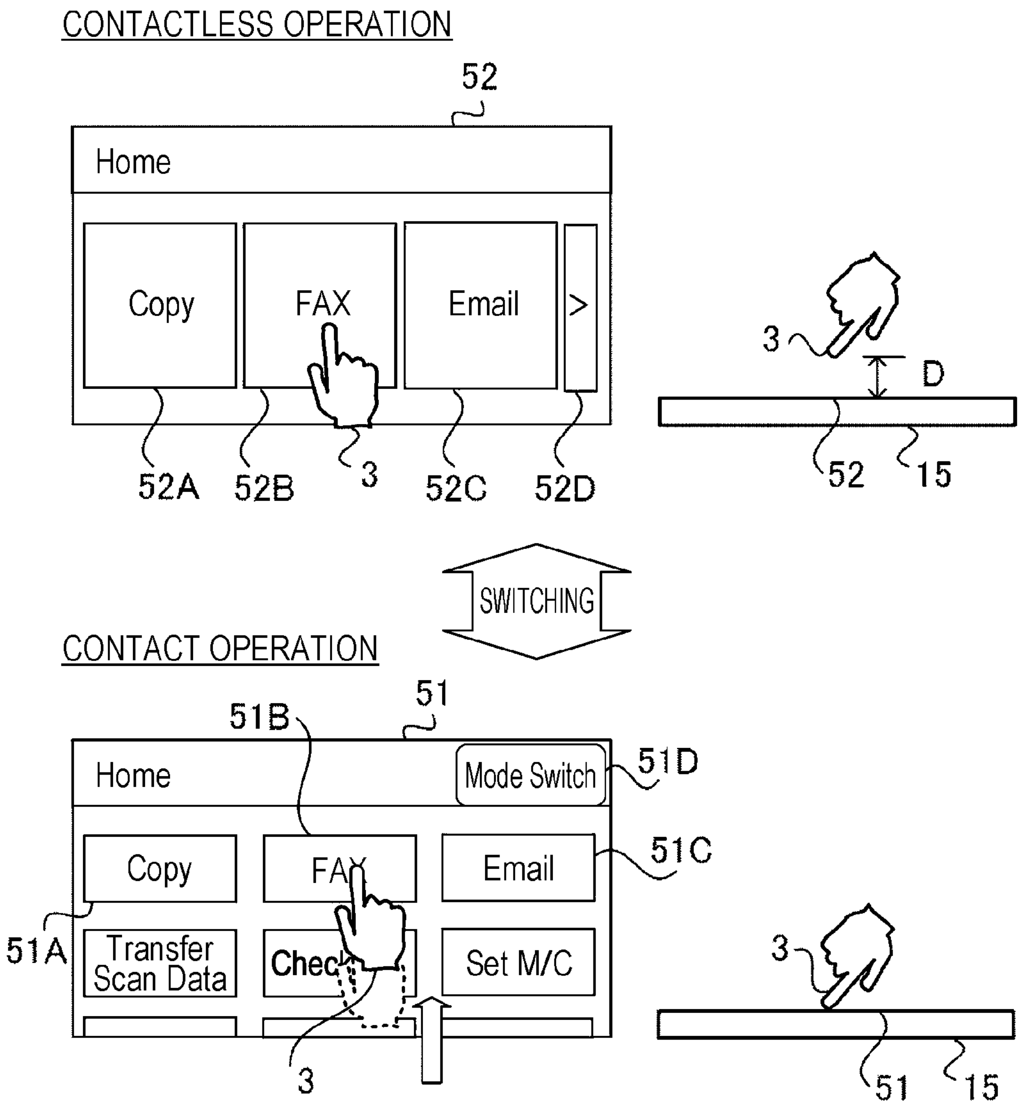
FIG. 9 is a diagram illustrating a mode switching process for switching an operation mode between a contact operation mode and a contactless operation mode according to the exemplary embodiment.

FIG. 9 is a diagram illustrating a mode switching process for switching an operation mode between the contact operation mode and the contactless operation mode according to this exemplary embodiment. In FIG. 9, a first home screen 51 is an example of the first screen, and a second home screen 52 is an example of the second screen.

As illustrated in FIG. 9, the first home screen 51 displays a "Copy" button 51A, a "facsimile (FAX)" button 51B, and an "Email" button 51C as an example of objects. The first home screen 51 allows the user to make the first home screen 51 scroll to view hidden objects. The first home screen 51 further displays a "Mode Switch" button 51D. The "Mode Switch" button 51D is an example of a mode switching area for selectively receiving the contact operation and the contactless operation. Whether to operate the "Mode Switch" button 51D in a contact manner or a contactless manner can be set in advance. Upon operation of the "Mode Switch" button 51D, the first home screen 51 is switched to the second home screen 52.

The second home screen 52 is related to the first home screen 51 and is different from the first home screen 51 in the display form of objects. The second home screen 52 displays a "Copy" button 52A, a "FAX" button 52B, and an "Email" button 52C as an example of objects. The second home screen 52 further displays a page switching button 52D. The page switching button 52D is a button for switching the page to display an object. The "Copy" button 52A, the "FAX" button 52B, and the "Email" button 52C have a different display form from the "Copy" button 51A, the "FAX" button 51B, and the "Email" button 51C, respectively. In the example illustrated in FIG. 9, the size of the "Copy" button 52A, the "FAX" button 52B, and the "Email" button 52C is different from that of the "Copy" button 51A, the "FAX" button 51B, and the "Email" button 51C. Since an erroneous operation is more likely to occur in the contactless operation than in the contact operation, the size of the buttons used in the contactless operation is desirably larger than that of the buttons used in the contact operation to reduce the occurrence of erroneous operations.

The initial value of the operation mode is set to either the contact operation mode or the contactless operation mode by, for example, an apparatus administrator or the like. The initial value of the operation mode may be set for each user and applied when each user logs in. To switch the operation mode, as illustrated in FIG. 9, the switching unit 41A detects an operation distance D between the screen (the operation panel 15) and the user's finger 3 in a direction orthogonal to the screen, switches the operation mode to the contact operation mode if the operation distance D is equal to or less than a threshold, and switches the operation mode to the contactless operation mode if the operation distance D is greater than the threshold. The operation mode is switched to the contact operation mode, for example, when the user's finger 3 comes into contact with the screen, that is, when the Z coordinate=0. The threshold may be other than the Z coordinate=0, and an appropriate value is set by the user.

In response to switching from the initial value of the operation mode to one of the contact operation mode and the contactless operation mode, the switching unit 41A prohibits switching from the one to the other mode during operation, and cancels the prohibition of mode switching when a predetermined cancellation condition is satisfied. Examples of the cancellation condition include a condition that an operation by the user is not detected for a certain amount of time. Specific examples of the cancellation condition include a condition that an auto-clear timer counts a certain amount of time during which no operation is performed starting from the last operation, a condition that the user is logged out, and a condition that a power-saving mode is set. If the prohibition of the switching of the mode is canceled, the current operation mode is canceled and switched to, for example, the initial value of the operation mode. In response to the "Mode Switch" button 51D being operated in a contact or contactless manner during the contact operation mode, the operation mode may be switched to the contactless operation mode.

Figure 10:
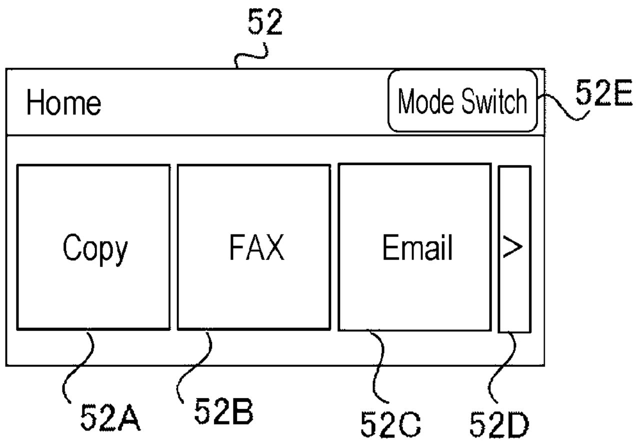
FIG. 10 is a front view illustrating another example of a second home screen according to the exemplary embodiment.

FIG. 10 is a front view illustrating another example of the second home screen 52 according to this exemplary embodiment.

The second home screen 52 illustrated in FIG. 10 further displays a "Mode Switch" button 52E in addition to the "Copy" button 52A, the "FAX" button 52B, the "Email" button 52C, and the page switching button 52D. The "Mode Switch" button 52E is an example of a mode switching area for selectively receiving the contact operation and the contactless operation, like the "Mode Switch" button 51D illustrated in FIG. 9 described above. Upon operation of the "Mode Switch" button 52E, the second home screen 52 is switched to the first home screen 51.

In response to detection of an approaching movement of the user's finger 3 to the second home screen 52 during the contactless operation mode, the switching unit 41A may switch the operation mode to the contact operation mode. The approaching movement is a movement in a certain direction, as illustrated in FIG. 11.

Figure 11:
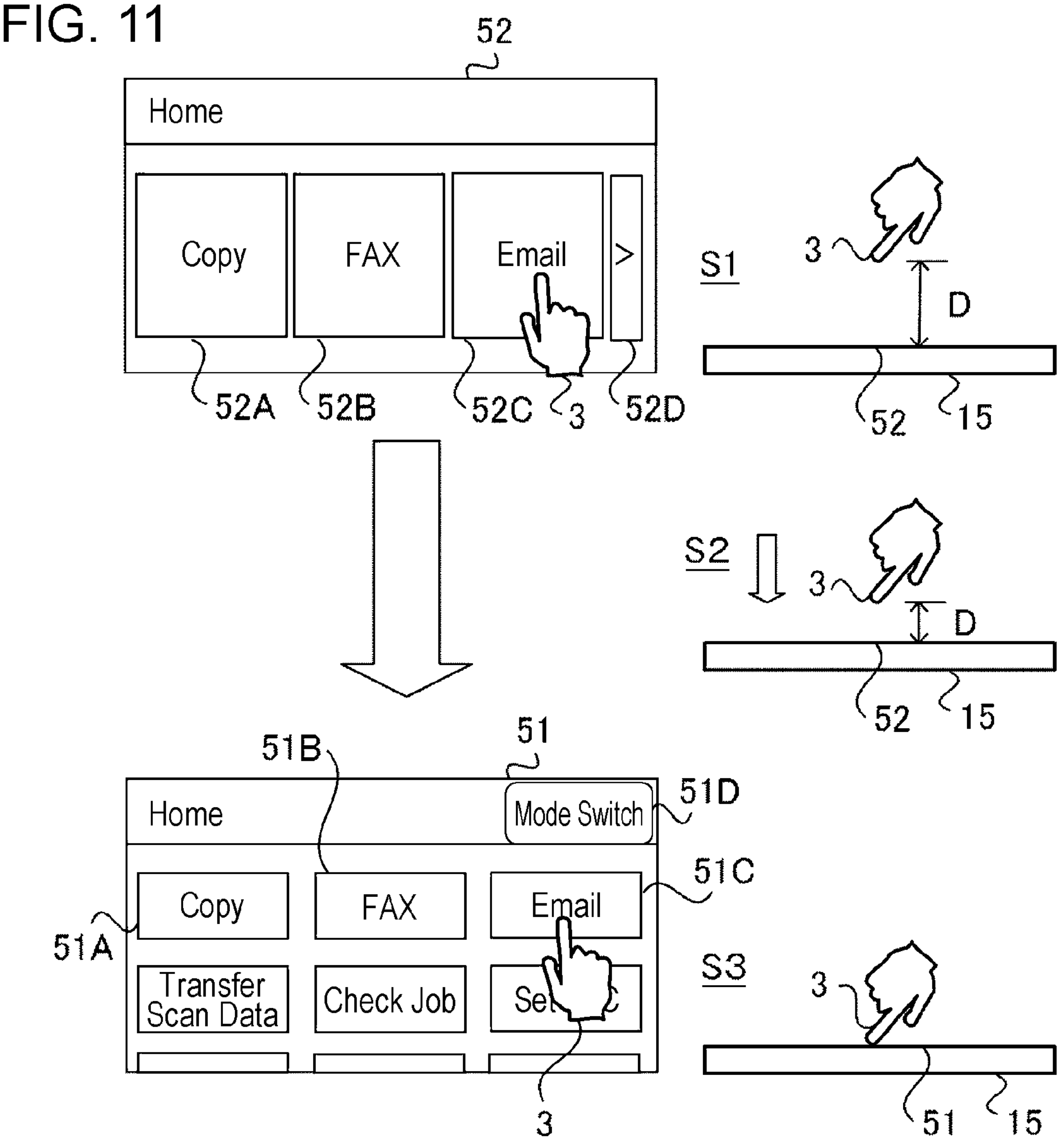
FIG. 11 is a diagram illustrating a mode switching process for switching the operation mode from the contactless operation mode to the contact operation mode according to the exemplary embodiment.

FIG. 11 is a diagram illustrating a mode switching process for switching the operation mode from the contactless operation mode to the contact operation mode according to this exemplary embodiment.

In S1 of FIG. 11, the second home screen 52 is displayed in the contactless operation mode, and the contactless operation is performed with the user's finger 3 at a position away from the second home screen 52 by the operation distance D.

In S2, the user's finger 3 is moved so as to approach the second home screen 52 in a certain direction, that is, so as to reduce the operation distance D in the certain direction.

In S3, in response to detection of an approaching movement of the user's finger 3 to the second home screen 52 during the contactless operation mode, the operation mode is switched to the contact operation mode, and the first home screen 51 is displayed.

That is, to switch the operation mode from the contactless operation mode to the contact operation mode, an operation of bringing the user's finger 3 closer to the second home screen 52 in the contactless operation mode from above (an operation of moving the user's finger 3 in the Z-axis direction) is performed to switch the operation mode. In this case, the operation of moving the user's finger 3 in the Z-axis direction is to be identified not as operating on the second home screen 52 but as an operation of switching the operation mode. Thus, the operation coordinates, which are the coordinates of a position pointed at by the user's finger 3, are ignored. In an implementation of a tap operation (a small amount of change in the Z coordinate) in the contactless operation mode, however, a certain coordinate change may be regarded as a user operation. Alternatively, as illustrated in FIG. 10 described above, the "Mode Switch" button 52E may be presented on the second home screen 52 in the contactless operation mode, and the operation mode may be switched in response to an operation of making the user's finger 3 hover over the "Mode Switch" button 52E for a certain amount of time.

Figure 12:
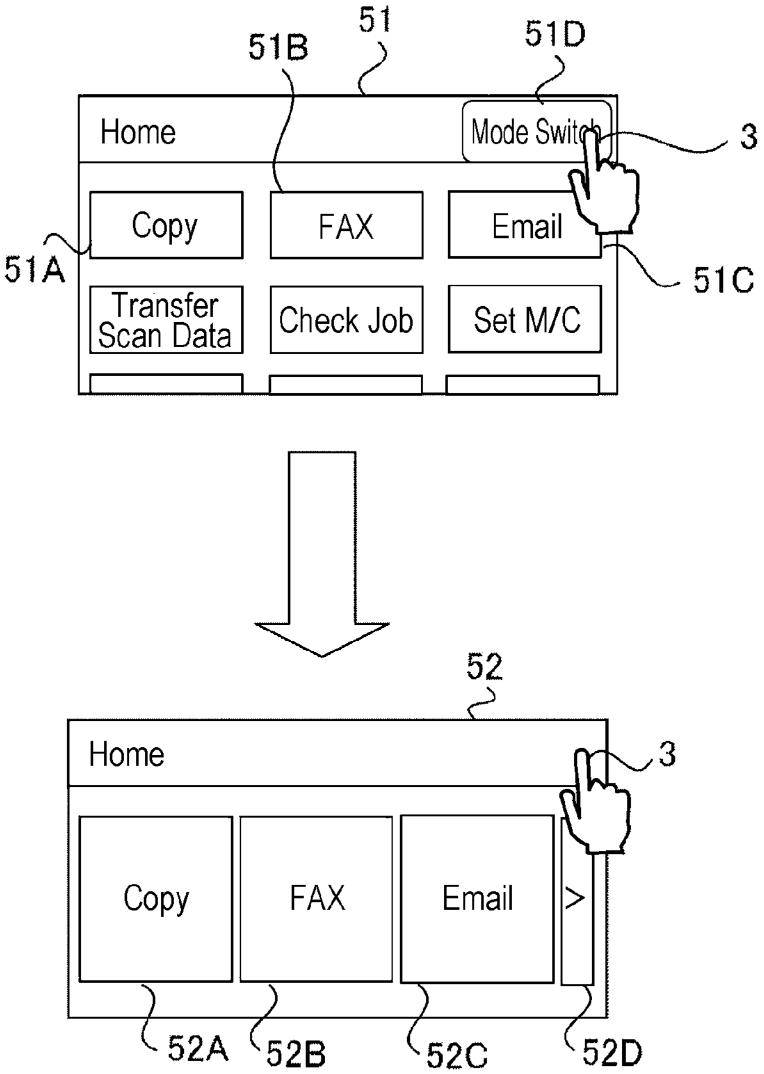
FIG. 12 is a diagram illustrating a mode switching process for switching the operation mode from the contact operation mode to the contactless operation mode according to the exemplary embodiment.

Alternatively, as illustrated in FIG. 12, in response to detection of the user's finger 3 hovering over the "Mode Switch" button 51D on the first home screen 51 in a contactless manner for a certain amount of time during the contact operation mode, the switching unit 41A may switch the operation mode to the contactless operation mode.

FIG. 12 is a diagram illustrating a mode switching process for switching the operation mode from the contact operation mode to the contactless operation mode according to this exemplary embodiment.

As illustrated in FIG. 12, to switch the operation mode from the contact operation mode to the contactless operation mode, the user performs an operation of making the user's finger 3 hover over the "Mode Switch" button 51D on the first home screen 51 in the contact operation mode for a certain amount of time, thereby switching the operation mode to the contactless operation mode and displaying the second home screen 52. Alternatively, in response to detection of contact of the user's finger 3 with the "Mode Switch" button 51D during the contact operation mode, the switching unit 41A may switch the operation mode to the contactless operation mode. To prevent an erroneous operation, a touch of the "Mode Switch" button 51D with the user's finger 3 may be ignored.

Figure 13:
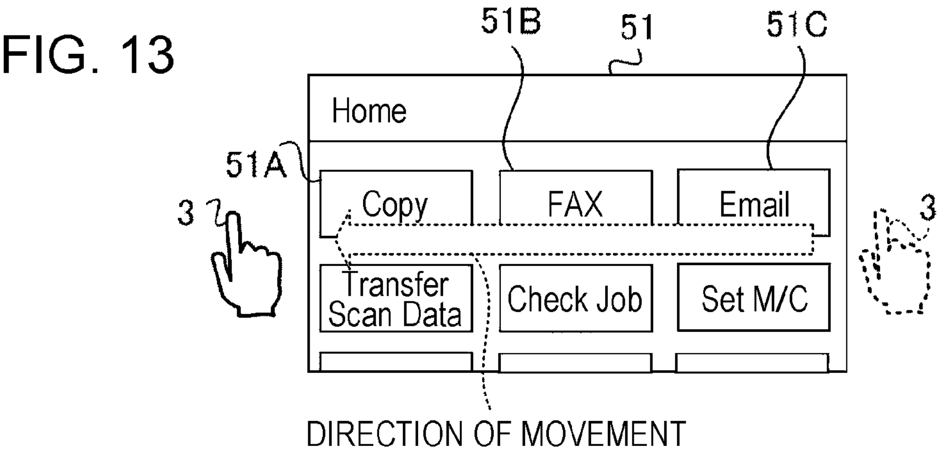
FIG. 13 is a diagram illustrating another mode switching process for switching the operation mode from the contact operation mode to the contactless operation mode according to the exemplary embodiment.

In another example, as illustrated in FIG. 13, the first home screen 51 does not include the "Mode Switch" button 51D. In this example, in response to detection of a predetermined operation performed on the first home screen 51 with the user's finger 3 in a contactless manner during the contact operation mode, the switching unit 41A switches the operation mode to the contactless operation mode.

FIG. 13 is a diagram illustrating another mode switching process for switching the operation mode from the contact operation mode to the contactless operation mode according to this exemplary embodiment.

As illustrated in FIG. 13, for example, in response to detection of the user's finger 3 moving through above the first home screen 51 in a contactless manner, the operation mode may be switched from the contact operation mode to the contactless operation mode. The predetermined operation to be performed on the first home screen 51 is not limited to the operation of moving through above the first home screen 51.

Figure 14:
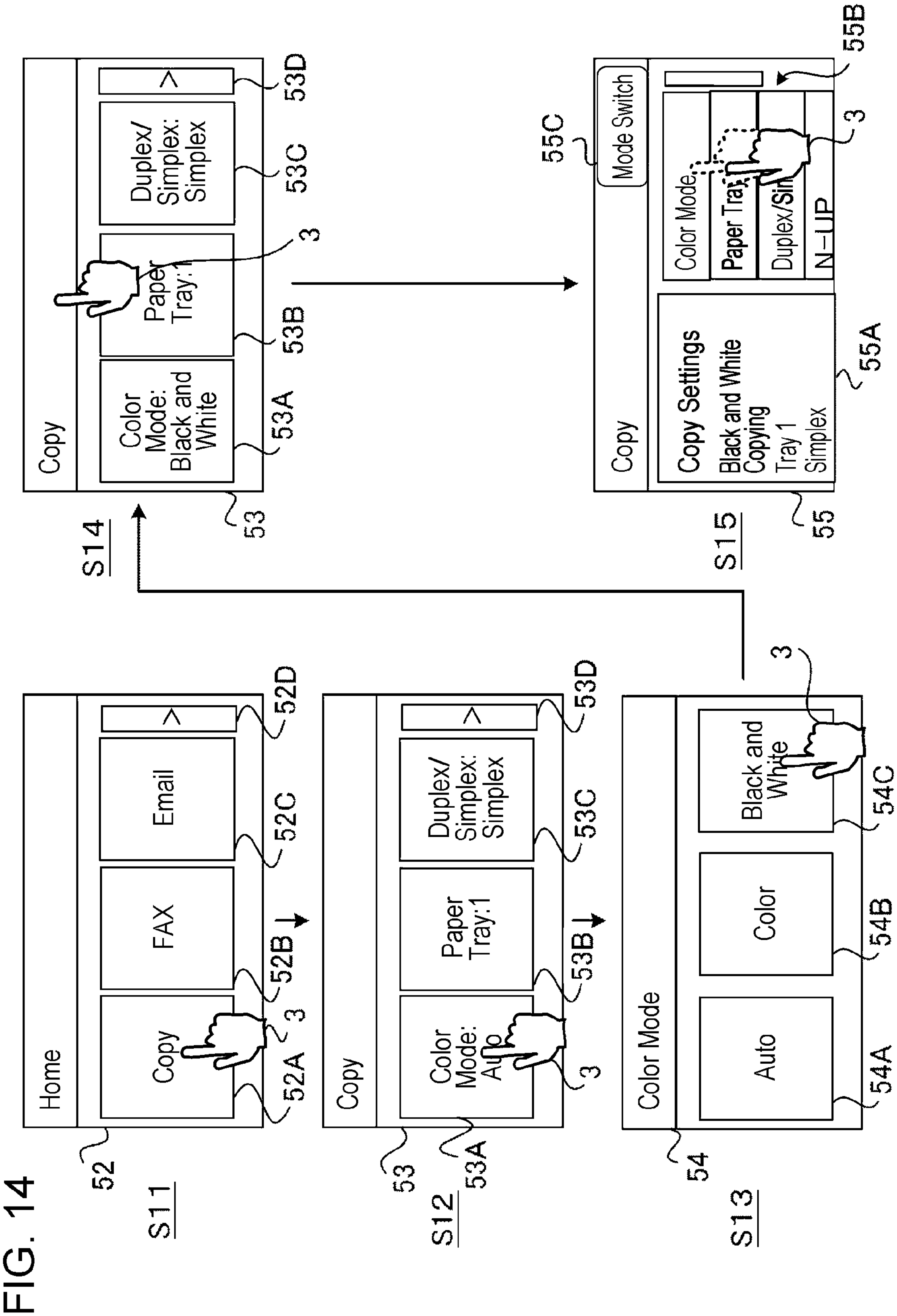
FIG. 14 is a diagram illustrating a process for carrying over setting values between modes according to the exemplary embodiment.

As illustrated in FIG. 14, in response to switching of the operation mode from one of the contact operation mode and the contactless operation mode to the other of the contact operation mode and the contactless operation mode, the switching unit 41A may carry over a setting value, which is set in the one operation mode (previous operation mode) before the switching, in the other operation mode (current operation mode) after the switching.

FIG. 14 is a diagram illustrating a process for carrying over setting values between modes according to this exemplary embodiment.

In S11 of FIG. 14, the second home screen 52 in the contactless operation mode is displayed. The "Copy" button 52A on the second home screen 52 is operated with the user's finger 3 in a contactless manner.

In S12, a copy setting screen 53 in the contactless operation mode is displayed in response to the operation on the "Copy" button 52A. The copy setting screen 53 displays a color mode button 53A, a paper tray button 53B, a duplex/simplex setting button 53C, and a page switching button 53D. The color mode button 53A on the copy setting screen 53 is operated with the user's finger 3 in a contactless manner.

In S13, a color mode setting screen 54 in the contactless operation mode is displayed in response to the operation on the color mode button 53A. The color mode setting screen 54 displays an "Auto" button 54A, a "Color" button 54B, and a "Black and White" button 54C. The "Black and White" button 54C on the color mode setting screen 54 is operated with the user's finger 3 in a contactless manner.

In S14, the copy setting screen 53 in the contactless operation mode is displayed in response to the operation on the "Black and White" button 54C. As in S12 above, the copy setting screen 53 displays the color mode button 53A, the paper tray button 53B, the duplex/simplex setting button 53C, and the page switching button 53D. However, the setting value of the color mode button 53A is set to "black and white" instead of "auto". At this time, the operation mode is switched to the contact operation mode.

In S15, a copy setting screen 55 in the contact operation mode is displayed in response to the operation on the copy setting screen 53 in the contactless operation mode. The copy setting screen 55 in the contact operation mode displays a copy setting button 55A, various setting buttons 55B, and a "Mode Switch" button 55C. The copy setting button 55A in the contact operation mode displays the setting "black and white", which is carried over from the setting in the contactless operation mode.

Next, the operation of the image processing apparatus 10 according to this exemplary embodiment will be described with reference to FIG. 15.

Figure 15:
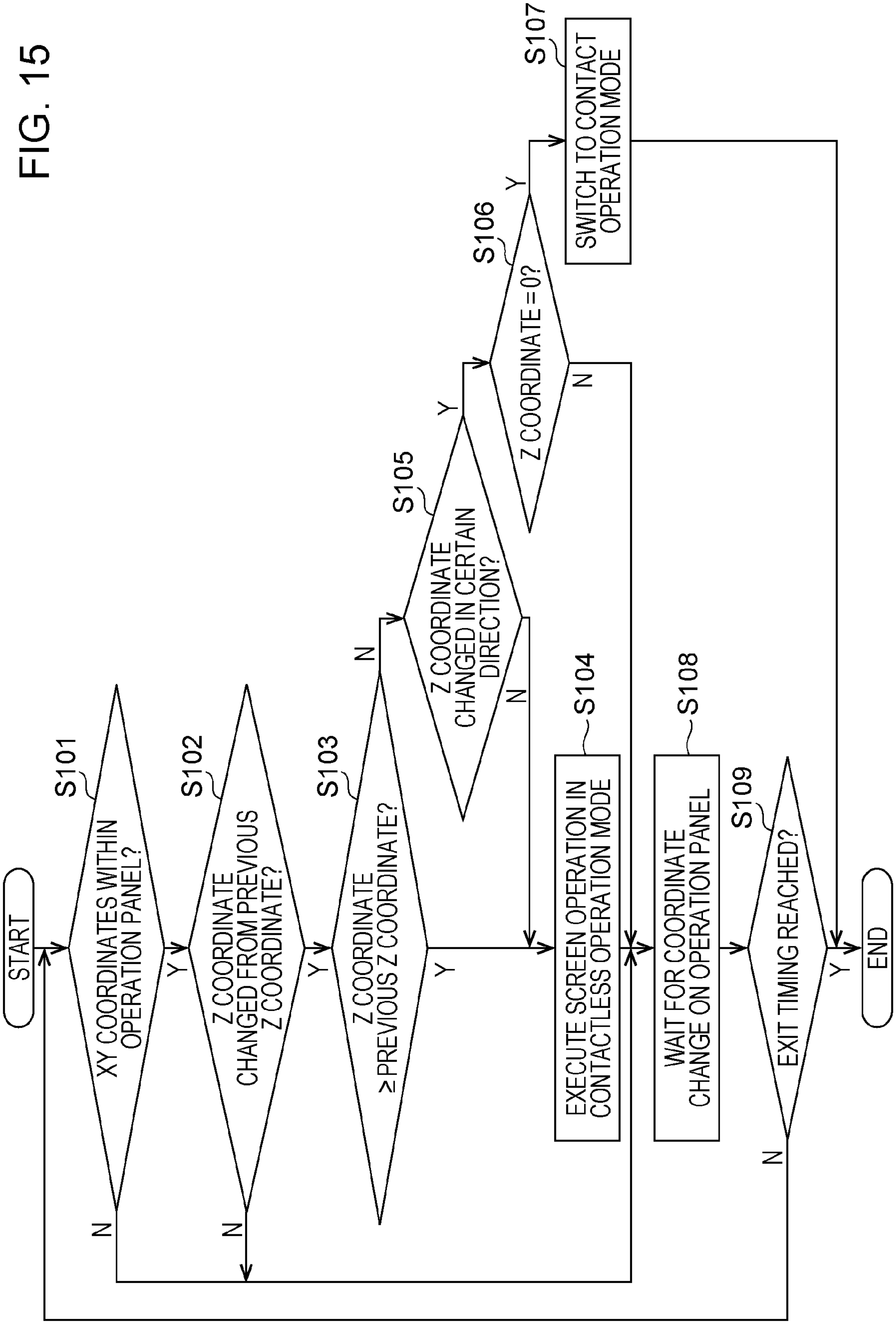
FIG. 15 is a flowchart illustrating an example of a mode switching process based on an information processing program according to the exemplary embodiment.

FIG. 15 is a flowchart illustrating an example of a mode switching process based on an information processing program according to this exemplary embodiment. In the example illustrated in FIG. 15, the operation mode is switched from the contactless operation mode to the contact operation mode.

First, in response to an instruction to execute a mode switching process through the operation panel 15, the CPU 41 activates the information processing program and executes the steps described below.

In step S101 in FIG. 15, the CPU 41 detects a coordinate change on the second home screen 52 in the contactless operation mode. Then, in an example, as illustrated in FIG. 11 described above, the CPU 41 determines whether the XY coordinates of the user's finger 3 are within the operation panel 15. If it is determined that the XY coordinates of the user's finger 3 are within the operation panel 15 (if a positive determination is made), the process proceeds to step S102. If it is determined that the XY coordinates of the user's finger 3 are not within the operation panel 15 (if a negative determination is made), the process proceeds to step S108.

In step S102, the CPU 41 determines whether the Z coordinate of the user's finger 3 is changed from the previous Z coordinate of the user's finger 3. If it is determined that the Z coordinate of the user's finger 3 is changed from the previous Z coordinate of the user's finger 3 (if a positive determination is made), the process proceeds to step S103. If it is determined that the Z coordinate of the user's finger 3 is not changed from the previous Z coordinate of the user's finger 3 (if a negative determination is made), the process proceeds to step S108.

In step S103, the CPU 41 determines whether the Z coordinate of the user's finger 3 is equal to or greater than the previous Z coordinate of the user's finger 3. If it is determined that the Z coordinate of the user's finger 3 is equal to or greater than the previous Z coordinate of the user's finger 3 (if a positive determination is made), the process proceeds to step S104. If it is determined that the Z coordinate of the user's finger 3 is less than the previous Z coordinate of the user's finger 3 (if a negative determination is made), the process proceeds to step S105.

In step S104, the CPU 41 executes a screen operation in the contactless operation mode. Then, the process proceeds to step S108.

In step S105, the CPU 41 determines whether the Z coordinate of the user's finger 3 is changed in a certain direction. If it is determined that the Z coordinate of the user's finger 3 is changed in the certain direction (if a positive determination is made), the process proceeds to step S106. If it is determined that the Z coordinate of the user's finger 3 is not changed in the certain direction (if a negative determination is made), the process proceeds to step S104.

In step S106, the CPU 41 determines whether the Z coordinate of the user's finger 3 is 0. If it is determined that the Z coordinate of the user's finger 3 is 0 (if a positive determination is made), the process proceeds to step S107. If it is determined that the Z coordinate of the user's finger 3 is not 0 (if a negative determination is made), the process proceeds to step S108.

In step S107, the CPU 41 switches the operation mode to the contact operation mode, and displays the first home screen 51. Then, the mode switching process based on the information processing program ends.

In step S108, the CPU 41 waits for a coordinate change on the operation panel 15. Then, the process proceeds to step S109.

In step S109, the CPU 41 determines whether the exit timing is reached. If it is determined that the exit timing is not reached (if a negative determination is made), the process returns to step S101, and the processing is repeated. If it is determined that the exit timing is reached (if a positive determination is made), the mode switching process based on the information processing program ends. As used herein, the term "exit timing" refers to a timing at which the power is turned off or a timing at which the image processing apparatus 10 enters a sleep mode, for example.

As described above, according to this exemplary embodiment, it is possible to switch a mode between the contact operation mode and the contactless operation mode in response to an operation performed on a screen in a contactless manner in accordance with the mode. This enables a user who does not wish to touch the screen as much as possible to switch the mode by a contactless operation.

In the exemplary embodiment above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the exemplary embodiment above, the term "processor" is broad enough to encompass one processor or plural processors in collaboration which are located physically apart from each other but may work cooperatively. The order of operations of the processor is not limited to one described in the exemplary embodiment above, and may be changed.

An image processing apparatus has been described as an example of an information processing apparatus according to some exemplary embodiments. Exemplary embodiments may be provided as a program for causing a computer to execute the functions of the information processing apparatus. Exemplary embodiments may be provided as a non-transitory computer-readable storage medium storing such a program.

In addition, the configuration of an information processing apparatus described in the exemplary embodiment described above is an example and may be changed depending on the situation without departing from the scope of the present disclosure.

Additionally, a process flow of a program described in the exemplary embodiment described above is also an example, and any unnecessary step may be deleted, a new step may be added, or the processing order may be changed without departing from the scope of the present disclosure.

In the exemplary embodiment described above, a program is executed to implement processing according to an exemplary embodiment by a software configuration using a computer, by way of example but not limitation. The exemplary embodiment may be implemented by, for example, a hardware configuration or a combination of a hardware configuration and a software configuration.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

APPENDIX

An information processing apparatus according to (((1))) includes a processor configured to switch a mode between a first mode and a second mode in response to an operation performed on a screen in a contactless manner in accordance with the mode, the first mode being a mode in which a first screen for performing a contact operation with a target contacting an object in the screen is displayed, the second mode being a mode in which a second screen for performing a contactless operation without the target contacting the object in the screen is displayed, the second screen being related to the first screen and different from the first screen in a display form of the object.

An information processing apparatus according to (((2))) is the information processing apparatus according to (((1))), in which the processor is configured to detect a distance between the screen and the target in a direction orthogonal to the screen, switch the mode to the first mode when the distance is equal to or less than a threshold, and switch the mode to the second mode when the distance is greater than the threshold.

An information processing apparatus according to (((3))) is the information processing apparatus according to (((2))), in which the processor is configured to in response to switching of the mode to one of the first mode and the second mode, prohibit switching of the mode from the one to the other of the first mode and the second mode during operation, and cancel prohibition of the switching of the mode when a predetermined cancellation condition is satisfied.

An information processing apparatus according to (((4))) is the information processing apparatus according to (((1))), in which the processor is configured to switch the mode to the first mode in response to detection of an approaching movement of the target to the screen during the second mode.

An information processing apparatus according to (((5))) is the information processing apparatus according to (((4))), in which the approaching movement is a movement in a certain direction.

An information processing apparatus according to (((6))) is the information processing apparatus according to any one of (((1))) to (((5))), in which the first screen includes a mode switching area for selectively receiving the contact operation and the contactless operation, and the processor is configured to switch the mode to the second mode in response to detection of the target hovering over the mode switching area in a contactless manner for a certain amount of time during the first mode.

An information processing apparatus according to (((7))) is the information processing apparatus according to (((6))), in which the processor is configured to switch the mode to the second mode in response to detection of the target contacting the mode switching area during the first mode.

An information processing apparatus according to (((8))) is the information processing apparatus according to any one of (((1))) to (((5))), in which the processor is configured to switch the mode to the second mode in response to detection of a predetermined operation performed on the screen with the target in a contactless manner during the first mode.

An information processing apparatus according to (((9))) is the information processing apparatus according to any one of (((1))) to (((8))), in which the processor is configured to in response to switching of the mode from one of the first mode and the second mode to the other of the first mode and the second mode, carry over a setting value, which is set in the one of the first mode and the second mode before the switching, in the other of the first mode and the second mode after the switching.

An information processing program according to (((10))) causes a computer to execute switching a mode between a first mode and a second mode in response to an operation performed on a screen in a contactless manner in accordance with the mode, the first mode being a mode in which a first screen for performing a contact operation with a target contacting an object in the screen is displayed, the second mode being a mode in which a second screen for performing a contactless operation without the target contacting the object in the screen is displayed, the second screen being related to the first screen and different from the first screen in a display form of the object.

What is claimed is:

1. An information processing apparatus comprising:
- a processor configured to:
  - switch a mode between a first mode and a second mode in response to an operation performed on a screen in a contactless manner in accordance with the mode,
    - the first mode being a mode in which a first screen for performing a contact operation with a target contacting an object in the screen is displayed, and
    - the second mode being a mode in which a second screen for performing a contactless operation without the target contacting the object in the screen is displayed, the second screen being related to the first screen and different from the first screen in a display form of the object, wherein
- a display size of the object on the second screen is larger than the display size of the corresponding object on the first screen.

2. The information processing apparatus according to claim 1, wherein the processor is configured to:
- detect a distance between the screen and the target in a direction orthogonal to the screen;
- switch the mode to the first mode when the distance is equal to or less than a threshold; and
- switch the mode to the second mode when the distance is greater than the threshold.

3. The information processing apparatus according to claim 2, wherein the processor is configured to:
- in response to switching of the mode to one of the first mode and the second mode,
- prohibit switching of the mode from the one to the other of the first mode and the second mode during operation; and
- cancel prohibition of the switching of the mode when a predetermined cancellation condition is satisfied.

4. The information processing apparatus according to claim 1, wherein the processor is configured to switch the mode to the first mode in response to detection of an approaching movement of the target to the screen during the second mode.

5. The information processing apparatus according to claim 4, wherein the approaching movement is a movement in a certain direction.

6. The information processing apparatus according to claim 1, wherein
- the first screen includes a mode switching area for selectively receiving the contact operation and the contactless operation, and
- the processor is configured to switch the mode to the second mode in response to detection of the target hovering over the mode switching area in a contactless manner for a certain amount of time during the first mode.

7. The information processing apparatus according to claim 6, wherein the processor is configured to switch the mode to the second mode in response to detection of the target contacting the mode switching area during the first mode.

8. The information processing apparatus according to claim 1, wherein the processor is configured to switch the mode to the second mode in response to detection of a predetermined operation performed on the screen with the target in a contactless manner during the first mode.

9. The information processing apparatus according to claim 1, wherein the processor is configured to:
- in response to switching of the mode from one of the first mode and the second mode to the other of the first mode and the second mode,
- carry over a setting value, which is set in the one of the first mode and the second mode before the switching, in the other of the first mode and the second mode after the switching.

10. A non-transitory computer readable medium storing a program causing a computer to execute a process for information processing, the process comprising:
- switching a mode between a first mode and a second mode in response to an operation performed on a screen in a contactless manner in accordance with the mode,
  - the first mode being a mode in which a first screen for performing a contact operation with a target contacting an object in the screen is displayed, and
  - the second mode being a mode in which a second screen for performing a contactless operation without the target contacting the object in the screen is displayed, the second screen being related to the first screen and different from the first screen in a display form of the object, wherein
- a display size of the object on the second screen is larger than the display size of the corresponding object on the first screen.

11. An information processing method comprising:
- switching a mode between a first mode and a second mode in response to an operation performed on a screen in a contactless manner in accordance with the mode,
  - the first mode being a mode in which a first screen for performing a contact operation with a target contacting an object in the screen is displayed, and
  - the second mode being a mode in which a second screen for performing a contactless operation without the target contacting the object in the screen is displayed, the second screen being related to the first screen and different from the first screen in a display form of the object, wherein
- a display size of the object on the second screen is larger than the display size of the corresponding object on the first screen.

* * * * *